F. E. KEYES.
WATER STRAINER.
APPLICATION FILED FEB. 24, 1911.
993,839.
Patented May 30, 1911.
2 SHEETS—SHEET 1.
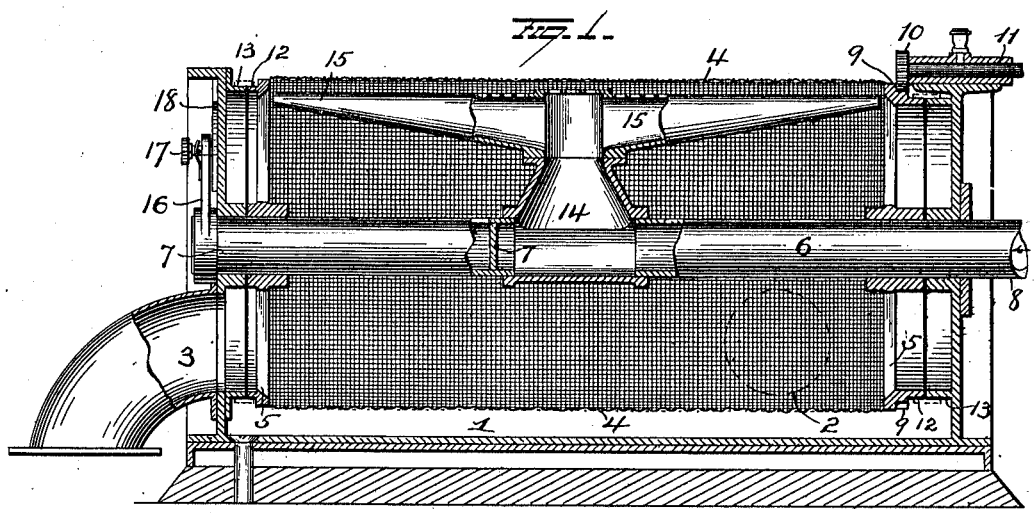
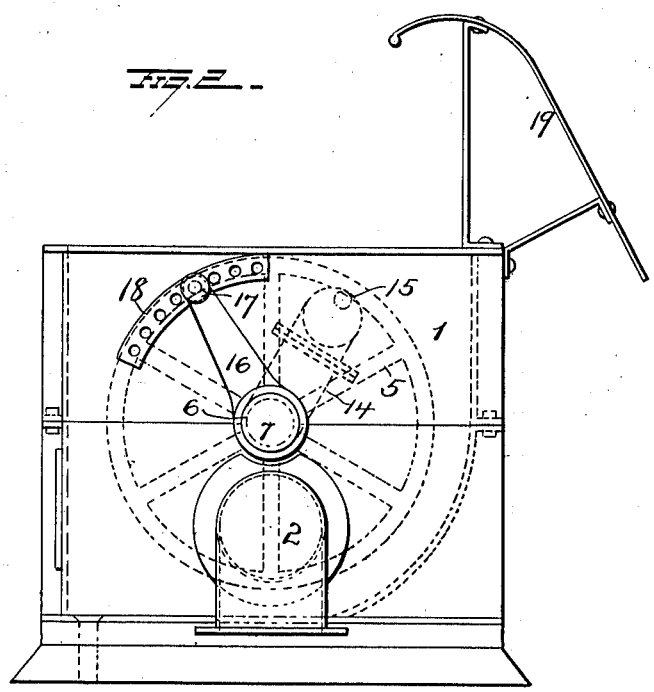
WITNESSES
INVENTOR
F. E. Keyes
Attorneys F. E. KEYES.
WATER STRAINER.
APPLICATION FILED FEB. 24, 1911.
993,839.
Patented May 30, 1911.
2 SHEETS—SHEET 2.
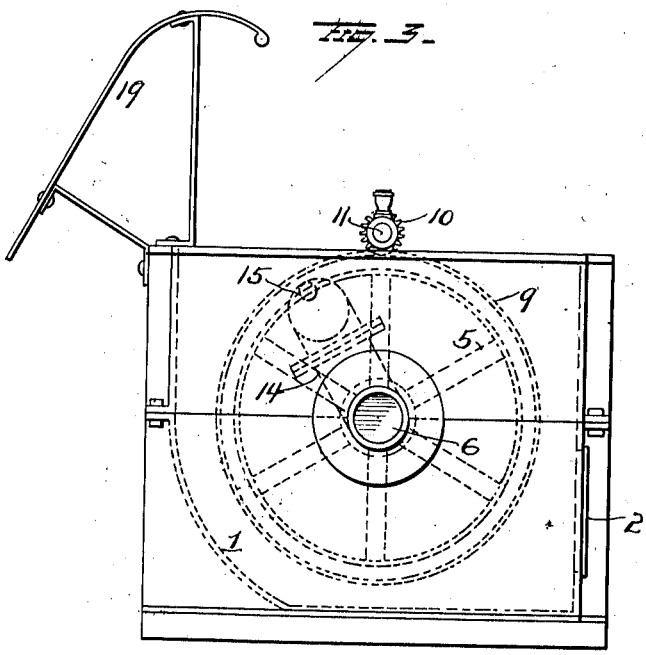
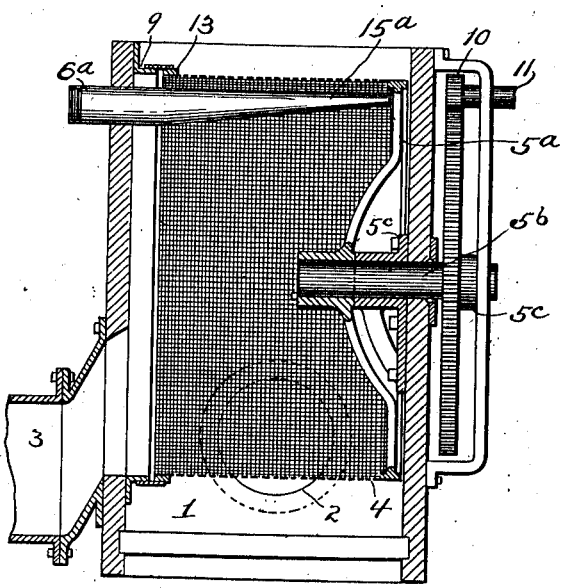

UNITED STATES PATENT OFFICE.

FRANK EUGENE KEYES, OF NEW YORK, N. Y.

WATER-STRAINER.

993,839.  Specification of Letters Patent.  Patented May 30, 1911.

Application filed February 24, 1911. Serial No. 610,494.

*To all whom it may concern:*

Be it known that I, FRANK E. KEYES, of New York, in the county of New York and State of New York, have invented certain new and useful Improvements in Water-Strainers; and I do hereby declare the following to be a full, clear, and exact description of the invention, such as will enable others skilled in the art to which it appertains to make and use the same.

My invention relates to an improvement in water strainers adapted particularly for use in pulp mills, bleacheries, etc., but which may be used in connection with the water systems of other industries, the object being to provide simple and economical means for readily and quickly recovering all solids from the water, and clearing the water so that it may be used over and over again and it consists in the parts and combinations of parts as will be more fully described and pointed out in the claims.

In the accompanying drawings Figure 1 is a view in longitudinal section of my improved strainer. Fig. 2 is a view in end elevation showing the means for adjusting the air or steam nozzle. Fig. 3 is a view of the opposite end, and Fig. 4 is a view in section of a modified form of apparatus.

1 represents a tank preferably rectangular in shape and of any desired size, provided at one end, or at either side or its bottom, with an inlet for the water to be strained. In the present instance I have shown the inlet 2 in one side of the tank. The outlet 3 is located at one end in line with the end of the strainer, which latter is in the form of a reel composed of two circular spiders, or skeleton heads 5, and a finely perforated metal, or woven wire cylinder 4, secured at its ends to the heads 5. The reel thus formed is approximately the length of the tank, but is of less diameter than the latter, so as to accommodate an ample supply of water or pulp.
This water or pulp passes into the tank outside of the strainer reel and enters the latter through the perforations or openings in the cylinder. The heads 5 of this reel are mounted on the pipe 6 which latter passes longitudinally through the tank and is closed at its end 7, and connected at its opposite end 8 to a pipe (not shown), leading to an air compressor or to a steam generator. One head 5 of the reel is provided with an annular gear 9, which meshes with a pinion 10 on shaft 11, the latter being coupled up to any suitable motor or shaft, whereby continuous rotary motion may be imparted to the reel.

Each head 5 is provided with an outwardly projecting circular ring or collar 12 concentric with the axis of the reel, the outer edge of which conforms to and coacts with a similar collar 13 projecting inwardly from each end of the tank, for preventing the passage of any volume of water between the tank and the reel. In the drawings I have shown the edges of the rings in contact, which would certainly prevent the passage of any solids with the water, but if desired I can employ packing rings as shown in Fig. 4 which will prevent the passage of any water from the tank to the reel through the heads, or from the reel to the tank through the heads.

Secured to pipe 6 is the T-coupling 14 carrying the elongated nozzle 15, the latter being approximately the length of the reel, and provided on its side adjacent the wire gauze cylinder 4 with a series of perforations, or with a narrow slit, extending throughout its length. This nozzle is located within the reel, with its perforation or slit adjacent the cylinder of the reel, hence it will be seen that compressed air or steam admitted to pipe 6, will pass into the nozzle and be projected against the inner face of the cylinder and operate to dislodge any solids adhering to the outer face of the latter. The pipe 6 is provided at its closed end 7 with a hand lever 16, by which the pipe may be partly turned so as to change the position of the nozzle 15, and the direction of discharge of the solids from the outer surface of the cylinder, and this lever 16 carries a spring dog 17 adapted to engage any one of the recesses in the segment 18, secured to the end of the tank, for holding pipe 6 and the nozzle 15 in their adjusted positions.

In the operation of the apparatus water, say from a pulp or paper mill is permitted to flow, or is forced, into the tank outside the cylinder, and passes into the latter, the pulp and other solids adhering to the outer face of the wire cylinder. As the cylinder is revolved by the gears 9 and 10 the adhering solids are carried above the water level in the tank, and as they pass over the nozzle 15, are forcibly removed from the cylinder by the air or steam blast from the nozzle. The water freed from its solids passes from the cylinder through the head into outlet pipe 3, and may if desired or necessary be returned to the vats to be used over again.

If the solids be of any value, they may be blown by the air or steam blast against the shield 19 as shown in Fig. 3, which deflects them into a tub or other receptacle placed to receive them, whereas if the solids be of no use, the nozzle 15 can be so adjusted to deposit them on a waste pile at the opposite side of the vat.

Instead of mounting the reel at both ends, it may be wholly open at one end and mounted on a rotating shaft at its opposite ends as shown in Fig. 4. In this construction the head $5^a$ may be in the form of a spider as shown, or it may be closed and this is also true of the head farthest removed from the outlet port in the previously described construction. This head $5^a$ is keyed to the shaft $5^b$ mounted in bearings $5^c$ secured to the end of the tank, and the shaft carries a gear $9^a$ meshing with the pinion 10. The head $5^a$ has an elongated bearing for the shaft $5^b$, and its outer edge runs close to the end wall of the tank so as to prevent the entrance of solids at the end of the cylinder. The opposite end of the cylinder is wholly open, and is in direct communication with the outlet 3. The pipe $6^a$ which terminates in a nozzle $15^a$ enters the cylinder at its open end near its top and operates in the manner previously described to remove the adhering solids from the outer surface of the cylinder.

In the modification Fig. 4, I have shown a flexible packing band or ring secured to one ring or collar 9 or 13 and overlapping the other so as to assist in sealing the joint between these parts, and as previously stated this feature may be employed in the construction shown in Fig. 1.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In a water strainer, the combination with a tank, a reticulated cylinder mounted to rotate in the tank, the ends of said cylinder being substantially closed to the tank, an inlet pipe leading to the tank outside of the cylinder and an outlet for the discharge of the water within the cylinder, of a nozzle discharging through its top and located within the cylinder near the top and extending approximately the length of the cylinder, means for supplying steam or air to said nozzle, and means for adjusting the position of the nozzle.

2. In a water strainer, the combination with a tank, a reticulated cylinder mounted to rotate in the tank, the ends of said cylinder being substantially closed to the tank, an inlet pipe leading to the tank outside of the cylinder, and an outlet for the discharge of water within the cylinder, of a nozzle having discharge openings in its top throughout its length and extending approximately the length of the cylinder adjacent the top of the latter, a shield in a plane above the vat, and means for shifting the nozzle whereby the solids removed from the cylinder by the jet may engage the shield.

3. In a strainer, the combination with a tank, a pressure pipe mounted in the ends of the latter, one end of said pipe being closed, and an elongated nozzle carried by and in communication with said pipe, of a reel composed of two heads mounted to rotate on said pipe one of said heads being open, a screen cylinder secured to said heads and inclosing the nozzle, and an outlet through the end of the tank adjacent the open head of the reel.

4. In a strainer, the combination with a tank, a pressure pipe mounted in the ends of the latter, one end of said pipe being closed and an elongated nozzle carried by and in communication with said pipe, of a reel composed of two open heads mounted to rotate on said pipe, sealing rings or collars on the heads and ends of the tank, a screen cylinder secured to the heads and inclosing the nozzle and an outlet through one end of the tank, communicating with the interior of the reel.

5. In a strainer, the combination of a tank, a pipe mounted to turn therein, a nozzle carried by and communicating with said pipe, means for partly rotating the pipe for changing or adjusting the position of the nozzle, a reel mounted to rotate on said pipe, an inlet leading to the tank outside of the reel, and an outlet leading from the interior of the reel through one end of the tank.

In testimony whereof, I have signed this specification in the presence of two subscribing witnesses.

FRANK EUGENE KEYES.

Witnesses:
 FRED. F. PARTRIDGE,
 RAY NUGENT.